United States Patent [19]

Compton et al.

[11] Patent Number: 5,228,022

[45] Date of Patent: Jul. 13, 1993

[54] BATTERY OPERATED COMPACT DISK CLEANER

[76] Inventors: Kenneth C. Compton, 2278 E. Williamson, Burton, Mich. 48529; George Spector, 233 Broadway, Rm. 702, New York, N.Y. 10279

[21] Appl. No.: 948,245

[22] Filed: Sep. 21, 1992

[51] Int. Cl.⁵ .................... G11B 3/58; G11B 23/50; G11B 33/14
[52] U.S. Cl. .................... 369/72; 15/347; 15/97.1; 15/DIG. 14; 360/128; 360/137
[58] Field of Search ............... 369/72; 360/128, 129, 360/137; 15/97.1, 106, DIG. 14, 301, 300.1, 347

[56] References Cited

U.S. PATENT DOCUMENTS

| | | | |
|---|---|---|---|
| 4,569,098 | 2/1986 | Kawabe | 369/72 |
| 4,654,917 | 4/1987 | Yeung | 369/72 |
| 4,825,497 | 5/1989 | Nagao et al. | 360/137 |

FOREIGN PATENT DOCUMENTS

| | | | |
|---|---|---|---|
| 55-28522 | 2/1980 | Japan | 369/72 |
| 61-177636 | 8/1986 | Japan | 369/72 |
| 62-52779 | 3/1987 | Japan | 369/72 |
| 4-14693 | 1/1992 | Japan | 369/72 |

*Primary Examiner*—Stuart S. Levy
*Assistant Examiner*—Joseph A. Rhoa

[57] ABSTRACT

An improved compact disk cleaner is provided which includes a base (12), a support table (14) rotatably mounted within the base for supporting a compact disk (16) thereon, an electric motor (18) having a shaft for rotating the support table and the compact disk within the base, a cover (22) hinged to the base and a mechanism carried on the underside of the cover for removing dust from the top surface of the compact disk, when the cover is closed over the base. The dust remover may include: a brush (30) and a fan (32) along with a removeable pan (34) including a filter (44); or a cleaning belt (62) with tracked rollers (56).

3 Claims, 2 Drawing Sheets

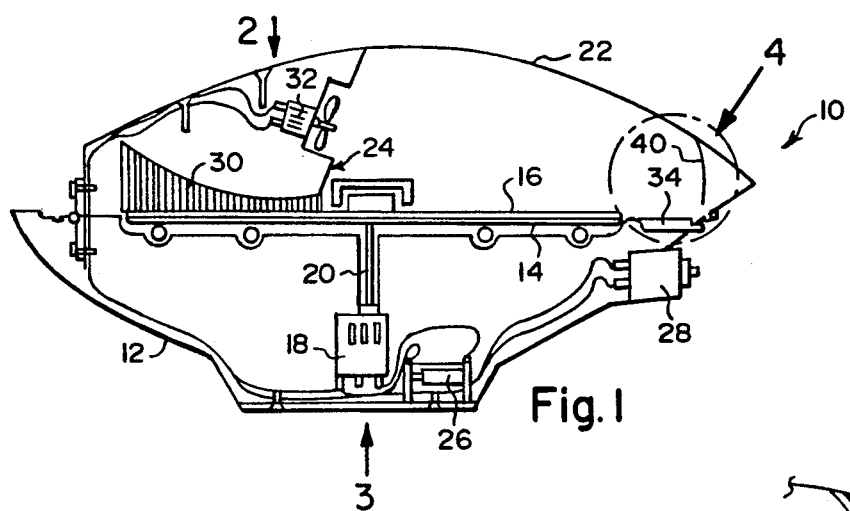
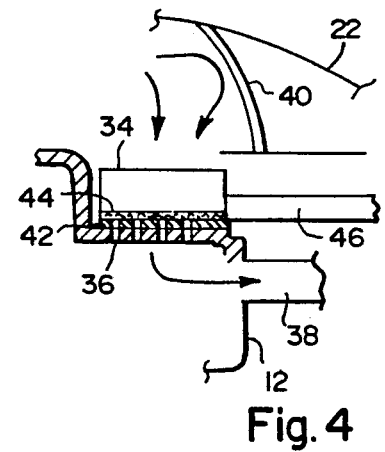
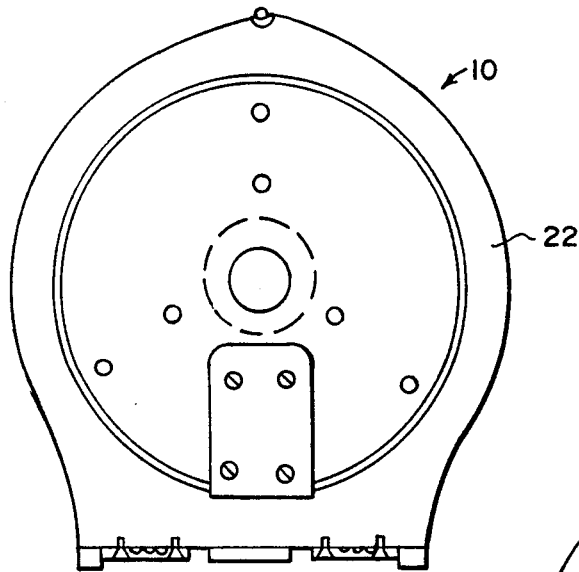
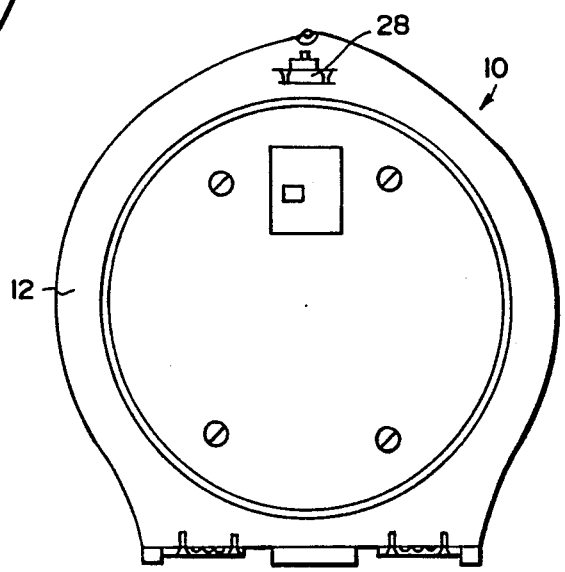

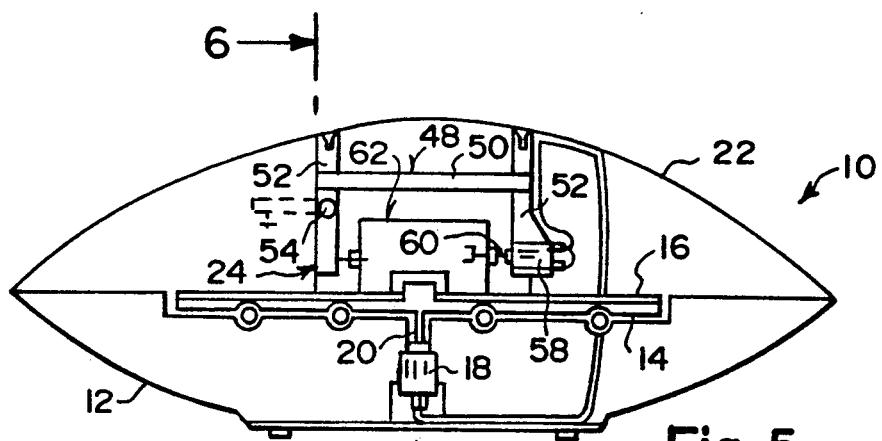
Fig. 5
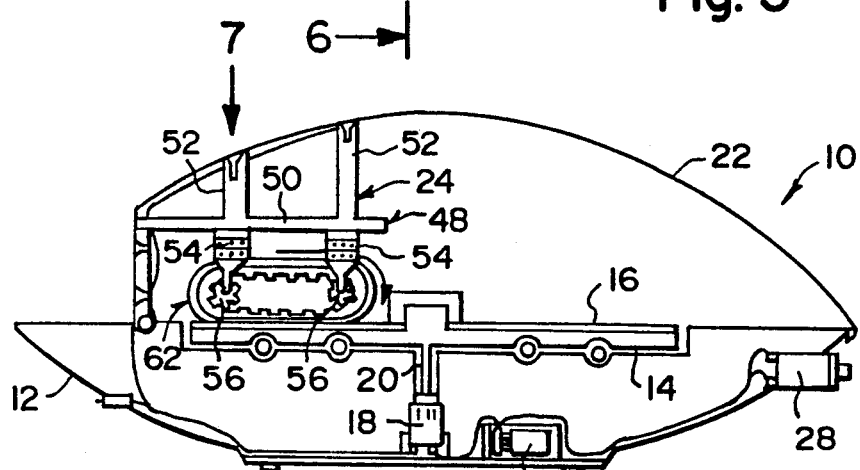
Fig. 6
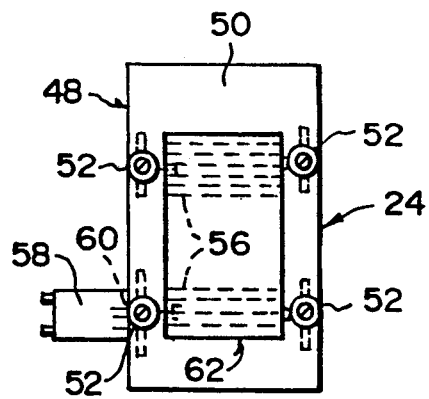
Fig. 7
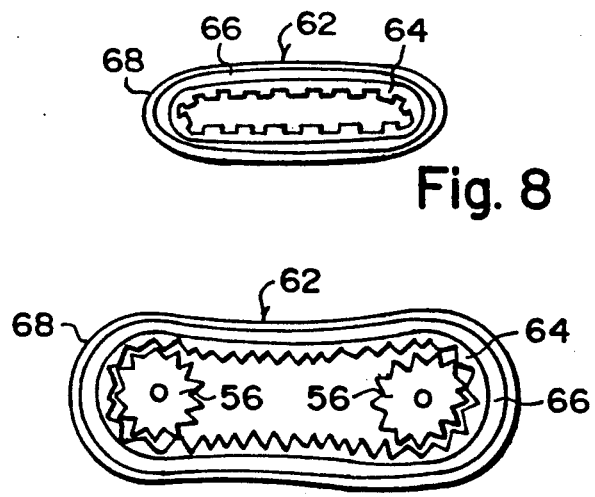
Fig. 8
Fig. 9

BATTERY OPERATED COMPACT DISK CLEANER

BACKGROUND OF THE INVENTION

The instant invention relates generally to record cleaning apparatuses and more specifically it relates to an improved compact disk cleaner, which provides a battery operated mechanism to clean compact disks.

There are available various conventional record cleaning apparatuses which do not provide the novel improvements of the invention herein disclosed.

SUMMARY OF THE INVENTION

A primary object of the present invention is to provide an improved compact disk cleaner that will overcome the shortcomings of the prior art devices.

Another object is to provide an improved compact disk cleaner that includes a soft cloth lint-free brush and a fan to blow dust away from the surface of a rotating compact disk and into a removable dust collector.

An additional object is to provide an improved compact disk cleaner that includes a cleaning belt system for radial cleaning the surface of a rotating compact disk from the center to the outer edge thereof.

A further object is to provide an improved compact disk cleaner that is simple and easy to use.

A still further object is to provide an improved compact disk cleaner that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic side cross sectional view of a first embodiment of the instant invention.

FIG. 2 is a diagrammatic top view taken in direction of arrow 2 in FIG. 1.

FIG. 3 is a diagrammatic bottom view taken in direction of arrow 3 in FIG. 1.

FIG. 4 is a diagrammatic enlarged cross sectional view as indicated by arrow 4 in FIG. 1, showing the removable pan and associated structures therein in greater detail.

FIG. 5 is a diagrammatic front cross sectional view of a second embodiment of the instant invention.

FIG. 6 is a diagrammatic side cross sectional view taken along line 6—6 in FIG. 5.

FIG. 7 is a diagrammatic top view taken in direction of arrow 7 in FIG. 6, showing the brace member above the cleaning belt and drive motor thereof.

FIG. 8 is a diagrammatic side view of the cleaning belt per se.

FIG. 9 is diagrammatic side view showing another variation for the tracked rollers and cleaning belt.

DETAILED DESCRIPTION OF THE PREFERRED EMBODIMENTS

Turning now descriptively to the drawings, in which similar reference characters denote similar elements throughout the several views, the Figures illustrate an improved compact disk cleaner 10, which consists of a base 12 and a support table 14 rotatably mounted within the base 12, for supporting a compact disk 16 thereon. An electric motor 18 having a shaft 20 is for rotating the support table 14 and the compact disk 16 within the base 12. A cover 22 is hinged to the base 12. A mechanism 24 is carried on the underside of the cover 22, for removing dust from the top surface of the compact disk 16, when the cover 22 is closed over the base 12.

A battery 26 is carried within the base 12 for supplying power to the electric motor 18. An on/off switch 28 is carried on the base 12 and is electrically connected between the battery 26 and the electric motor 18 for turning the power on and off.

The dust removing mechanism 24, as shown in FIG. 1, includes a soft cloth lint free brush 30, suspended from the underside of the cove 22 for lifting the dust of the top surface of the compact disk 16. An exhaust fan 32 is on the underside of the cover 22 for blowing the dust away from the compact disk 16. A removable pan 34 is carried on the base 12 adjacent the support table 14 opposite from the exhaust fan 24 to receive the dust therefrom.

As shown in FIG. 4, the base 12 has a perforated seat 36 for the removable pan 34 to sit upon and an exhaust port 38 connected under the perforated seat 36. A deflector plate 40 is suspended from the underside of the cover 22 to guide the dust into the removable pan 34. The removable pan 34 has a perforated bottom 42, a filter 44 placed upon the perforated bottom 42 and an elongated handle 46 extending outwardly from the perforated seat 36 in the base 12. The dust can be retained by the filter 44, while allowing air blown by the exhaust fan 32 to exit from the exhaust port 38.

The dust removing mechanism 24, shown in FIGS. 5 through 9, is a cleaning belt system 48 suspended from the underside of the cover 22, which includes a brace member 50 having four stabilizing bars 52, a pair of locking/unlocking hinges 54 on one side for two of the stabilizing bars 52. Two tracked rollers 56 are between said stabilizing bars 52. A second electric motor 58 has a shaft 60 to drive one of the tracked rollers 56. A cleaning belt 62 has an inner traction portion 64 to engage with the tracked rollers 56, a middle sponge portion 66 and an outer cleaning pad portion 68 for radial cleaning the top surface of the compact disk 16 from the center to the outer edge.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A compact disk cleaner which comprises:
   a base;
   a support table rotatably mounted within said base for supporting a compact disk thereon;
   an electric motor having a shaft for rotating said support table and the compact disk within said base;
   a cover hingedly attached to said base;
   means carried on the underside of said cover for removing dust from the top surface of the compact disk, when said cover is closed over said base;

a battery carried within said base for supplying power to said electric motor;

an on/off switch carried on said base electrically connected between said battery and said electric motor for turning the power on and off; and wherein said means for removing dust includes: a soft cloth lint free brush suspended from the underside of said cover for lifting the dust off of the top surface of the compact disk; an exhaust fan on the underside of said cover for blowing the dust away from the compact disk; and a removeable pan carried on the base adjacent said support table opposite from said exhaust fan for receiving the dust therefrom.

2. An improved compact disk cleaner as recited in claim 1, further including:

a) said base having a perforated seat for said removable pan to sit upon and an exhaust port connected under said perforated seat;

b) a deflector plate suspended from the underside of said cover to guide the dust into said removable pan; and c) said removable pan having a perforated bottom, a filter placed upon said perforated bottom and an elongated handle extending outwardly from said perforated seat in said base, so that the dust can be retained by said filter while allowing air blown b said exhaust fan to exit from said exhaust port.

3. A compact disk cleaner comprising:

a base;

a support table rotatably mounted within said base for supporting a compact disk thereon;

an electric motor having a shaft for rotating said support table and the compact disk within said base;

a cover hingedly attached to said base;

means carried on the underside of said cover for removing dust from the top surface of the compact disk, when said cover is closed over said base;

a battery carried within said base for supplying power to said electric motor;

an on/off switch carried on said base electrically connected between said battery and said electric motor for turning the power on and off; and wherein said dust removing means is a cleaning belt system suspended from the underside of said cover which includes: a brace member having four stabilizing bars, a pair of locking/unlocking hinges on one side for two of said stabilizing bars; two tracked rollers between said stabilizing bars; a second electric motor having a shaft to drive one of said tracked rollers; a cleaning belt having an inner traction portion to engage with said tracked roller; and a middle sponge portion and an outer cleaning pad portion for radial cleaning the top surface of the compact disk from the center to the outer edge.

* * * * *